United States Patent
Siegman et al.

(10) Patent No.: US 9,843,619 B2
(45) Date of Patent: *Dec. 12, 2017

(54) SYSTEM AND METHOD FOR ACCESSING DISK IMAGE FILES USING HTML5 KVM/VMEDIA CLIENT RUNNING IN A WEB BROWSER

(71) Applicant: AVOCENT HUNTSVILLE CORP., Huntsville, AL (US)

(72) Inventors: Craig S. Siegman, Pembroke Pines, FL (US); Joseph Amirthasamy, Plantation, FL (US); George N. Griffin, Coral Springs, FL (US)

(73) Assignee: Avocent Huntsville, LLC, Huntsville, AL (US)

( * ) Notice: Subject to any disclaimer, the term of this patent is extended or adjusted under 35 U.S.C. 154(b) by 271 days.

This patent is subject to a terminal disclaimer.

(21) Appl. No.: 14/437,724

(22) PCT Filed: Oct. 22, 2013

(86) PCT No.: PCT/US2013/066004
§ 371 (c)(1),
(2) Date: Apr. 22, 2015

(87) PCT Pub. No.: WO2014/066281
PCT Pub. Date: May 1, 2014

(65) Prior Publication Data
US 2015/0295994 A1    Oct. 15, 2015

Related U.S. Application Data

(60) Provisional application No. 61/717,299, filed on Oct. 23, 2012.

(51) Int. Cl.
G06F 15/16    (2006.01)
H04L 29/08    (2006.01)
(Continued)

(52) U.S. Cl.
CPC ............... H04L 67/06 (2013.01); G06F 8/60 (2013.01); G06F 9/45529 (2013.01);
(Continued)

(58) Field of Classification Search
CPC ..... H04L 67/42; H04L 67/06; H04L 67/1002; G06F 17/30076; G06F 9/45529; G06F 8/60
(Continued)

(56) References Cited

U.S. PATENT DOCUMENTS 6,304,895 B1    10/2001    Schneider et al.
6,378,009 B1 *    4/2002    Pinkston, II ........ G06F 13/4022
710/105
(Continued)

FOREIGN PATENT DOCUMENTS

CN    101958918 A    1/2011
CN    102609099 A    7/2012
WO    WO-2006118921 A2    11/2006

OTHER PUBLICATIONS

Office Action and Search Report issued in corresponding Chinese Application 201380055265.5 dated Jan. 11, 2017, 31 pages.
(Continued)

*Primary Examiner* — Anthony Mejia
*Assistant Examiner* — Binod J Kunwar
(74) *Attorney, Agent, or Firm* — Harness, Dickey & Pierce, P.L.C.

(57)    ABSTRACT

A method is disclosed for exposing virtual disk images on a user device, which is running an HTML5 KVM virtual media client in a Web browser, and which has established a KVM session with a KVM device associated with a remote device. A selected disk image file is initially obtained by the user device and a message sent to the remote device that the disk image file is available for use. The HTML5 KVM
(Continued)

virtual media client exposes the disk image file for use to the remote device, which sends a message to the HTML5 KVM virtual media client requesting a specific portion of the disk image file. The HTML5 KVM virtual media client receives the message and a script engine running in the Web browser creates a new file available to the Web browser of just the portion requested by the remote device, which is then transmitted to the remote device.

17 Claims, 2 Drawing Sheets

(51) Int. Cl.
  *G06F 17/30* (2006.01)
  *G06F 9/455* (2006.01)
  *G06F 9/445* (2006.01)
  *H04L 29/06* (2006.01)

(52) U.S. Cl.
  CPC .... *G06F 17/30076* (2013.01); *H04L 67/1002* (2013.01); *H04L 67/42* (2013.01)

(58) Field of Classification Search
  USPC .................................................. 709/203, 202
  See application file for complete search history.

(56) References Cited

U.S. PATENT DOCUMENTS

| | | | |
|---|---|---|---|
| 6,671,756 B1 | 12/2003 | Thomas et al. | |
| 8,548,919 B2* | 10/2013 | Lo .......................... | G06F 9/445 705/59 |
| 8,909,734 B2* | 12/2014 | Boss ..................... | G06F 3/0604 709/217 |
| 2003/0135656 A1 | 7/2003 | Schneider et al. | |
| 2004/0236821 A1* | 11/2004 | Metzger .............. | G06F 11/2294 709/200 |
| 2008/0282003 A1* | 11/2008 | Holovacs ................ | G06F 3/023 710/72 |
| 2009/0260074 A1* | 10/2009 | De Spiegeleer .. | H04L 29/08846 726/15 |
| 2010/0050170 A1* | 2/2010 | Parikh ................. | G06F 9/45537 718/1 |
| 2010/0077118 A1 | 3/2010 | Blackwell et al. | |
| 2011/0016466 A1* | 1/2011 | Liu .................... | G06F 17/30067 718/1 |
| 2011/0161482 A1* | 6/2011 | Bonola ................. | G06F 9/5077 709/223 |
| 2011/0302277 A1* | 12/2011 | Baker ............... | G06F 17/30575 709/219 |
| 2012/0117145 A1* | 5/2012 | Clift ...................... | G06F 9/4445 709/203 |
| 2012/0185621 A1 | 7/2012 | Goodley, II et al. | |
| 2013/0139234 A1* | 5/2013 | Inbaraj ................ | H04L 12/4625 726/7 |
| 2013/0215884 A1* | 8/2013 | Lo ....................... | G06F 13/4068 370/359 |
| 2013/0219060 A1* | 8/2013 | Sturgeon ................ | G06F 1/206 709/224 |

OTHER PUBLICATIONS

International Search Report and Written Opinion for PCT/US2013/066004, dated Feb. 3, 2014; ISA/KR.
Supplementary European Search Report for corresponding European Patent Application No. 13849954.6 dated Apr. 18, 2016, 9 pages.
Chen, Eric Yawei et al. "App Isolation", Computer and Communications Security, ACM, 2 Penn Plaza, Suite 701, New York, NY 10121-0701 USA, Oct. 17, 2011, pp. 227-238. XP058006054, DOI: 10.1145/2046707.2046734, ISBN: 978-1-4503-0948-6.
Anonymous: "KVM Switch—Wikipedia, the free encyclopedia", Jun. 25, 2012, XP055247190, Retrieved from the Internet: URL:https://en.wikipedia.org/w/index.php?title+KVM_switch &oldid=499283658 [retrieved on Feb. 3, 2016].

* cited by examiner

SYSTEM AND METHOD FOR ACCESSING DISK IMAGE FILES USING HTML5 KVM/VMEDIA CLIENT RUNNING IN A WEB BROWSER

CROSS-REFERENCE TO RELATED APPLICATIONS

This application claims priority to U.S. Provisional Application No. 61/717,299, filed Oct. 23, 2012. The entire disclosure of the above application is incorporated herein by reference.

FIELD

The present disclosure relates to systems and methods for accessing disk image files, and more particularly to a system and method for accessing disk image files using an HTML5 KVM virtual media client running in a Web browser of a user's device, and when the disk image file is too large to be copied as a single file into the Web browser's sandbox.

BACKGROUND

The statements in this section merely provide background information related to the present disclosure and may not constitute prior art.

Present day keyboard, video and mouse (KVM) appliances and baseboard management controllers (BMCs) allow a user to access remote servers and other devices by passing the keyboard, video and mouse signals between the user's device (typically a laptop, PC, tablet, smartphone, etc.) and the KVM appliance (or between the user's device and the BMC). For the purpose of discussion, the following examples will make reference only to a KVM appliance, but it will be appreciated that they are equally applicable to communication with a BMC. The keyboard and mouse signals received from a KVM virtual media client by the KVM appliance are typically received by the KVM appliance in some network protocol, for example Ethernet protocol packets. The Ethernet protocol packets are then converted to a format (e.g., USB) that the remote device can accept.

With the recent development of the HTML5 protocol, an HTML5 KVM virtual media client is now able to run in the Web browser of a user's device when a KVM session is established by the user. Currently HTML5 is supported by several web browsers including Apple Corporation's SAFARI® Web browser (recently released and now part of iOS6), Mozilla's FIREFOX® Web browser, and the Google CHROME® Web browser. The ability to run the HTML5 KVM virtual media client in the user's Web browser is a significant advantage because the user typically is highly familiar with using a Web browser. As such, this implementation provides the user with a comfortable, easy to use means for conducting a KVM session with a remote KVM device (e.g., KVM appliance or BMC).

Running an HTML5 KVM virtual media client in the user's Web browser does, however, present some significant limitations. For one, the Web browser does not allow the KVM virtual media client access to the physical disks of the client device on which the Web browser is running (e.g., PC workstation, laptop, computing tablet, smartphone, etc.). This necessitates the use of a disk image by the HTML5 KVM virtual media client. This limitation did not exist with a KVM virtual media client that did not run in the user's Web browser. The technology previously used, such as Java or ActiveX, allowed access to the physical media devices such as disk drives, and thus a disk image was not required to access the data files on the user device. When using a Web browser, however, the Web browser provides a "sandbox" into which the JavaScript engine that runs in the Web browser can bring files. But the JavaScript engine still is not allowed to write out the files, nor is it allowed direct access to the physical media devices on the user's device, such as disk drives, typically used in virtual media implementations.

Still another challenge when using an HTML5 KVM virtual media client running in a Web browser is the limited size of the Web browser's sandbox. Typically a Web browser's sandbox will be less than 1 GB in size. However, a disk image file may be much larger than the size of the Web browser's sandbox. The limited size of the sandbox may also be a problem if more than one disk image is in use at a given time. In some instances a disk image file may be an exact replica of a disk on the user's device. Thus, the size of the disk image file may potentially be equal to the entire storage capacity of a hard disk drive of the user's device, or in other words up to 3 TB worth of data with current technology. Alternatively, the disk image file may represent the entire contents of a flash drive. The disk image file may reside either on the user's device (e.g., PC workstation, laptop, tablet, smartphone, etc.) or it may be accessible by the user's device over a network, and network "mounted" to the user's device. But in any event, the size of the Web browser's sandbox will often be insufficient to enable the entire disk image file to be copied in a single operation into the Web browser's sandbox by the JavaScript engine.

In view of the above limitations imposed by a Web browser's sandbox when working with disk image files, a new system and method is needed for accessing the disk image files stored on the user's device, or physically accessible by the user's device.

SUMMARY

In one aspect the present disclosure relates to a method for exposing virtual disk images on a user device, where the user device is running an HTML5 KVM virtual media client in a Web browser of the user device, and where the user device has established a KVM session with a KVM device associated with the remote device. The method may comprise obtaining a selected disk image file for use by the user device. A message may be sent to the remote device that the disk image file is available for use. The HTML5 KVM virtual media client of the user device may be used to expose the disk image file for use to the remote device. The remote device may be used to send a request message to the HTML5 KVM virtual media client of the user device requesting a specific portion of the disk image file. The HTML5 KVM virtual media client may also be used to receive the request message. A script engine running in the Web browser may be used to create a new file available to the Web browser of just the portion requested by the remote device. The new file may then be transmitted to the remote device.

In another aspect the present disclosure relates to a method for exposing virtual disk images on a user device, where the user device is running an HTML5 KVM virtual media client in a Web browser of the user device, and where the user device has established a KVM session with a KVM device associated with the remote device. The method may comprise a plurality of operations comprising obtaining a selected disk image file for use by the user device, and then sending a message to the remote device that the disk image file is available for use. The HTML5 KVM virtual media client of the user device may be used to expose the disk image file for use to the remote device. The remote device may be used to send a request message to the HTML5 KVM virtual media client of the user device requesting a specific portion of the disk image file. The HTML5 KVM virtual media client may be used to receive the request message and, using a script engine running in the Web browser, may determine which specific bytes of the disk image file are being requested in the request message. The script engine may then be used to copy the specific bytes being requested into the Web browser's sandbox to form a new file. The HTML5 KVM virtual media client may then be used to transmit the new file from the sandbox to the remote device, and the remote device may be used to receive the new file.

In still another aspect the present disclosure relates to a system for exposing virtual disk images on a user device to a remote device. The system may comprise a user device; a Web browser running on the user device; an HTML5 KVM virtual media client running in the Web browser of the user device; and a script engine running in the Web browser. The HTML5 KVM virtual media client may be configured to obtain a selected disk image file for use by the user device, and then to send a message to the remote device that the disk image file is available for use. The HTML5 KVM virtual media client may also be configured to expose the disk image file to the remote device for use, and to receive a request message from the remote device requesting a specific portion of the disk image file. The script engine may be used to copy selected bytes of information from the disk image file corresponding to just the requested portion of the disk image file into the sandbox of the Web browser, and to create a new file using the selected bytes. The HTML5 KVM virtual media client may then be used to transmit the new file to the remote device.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
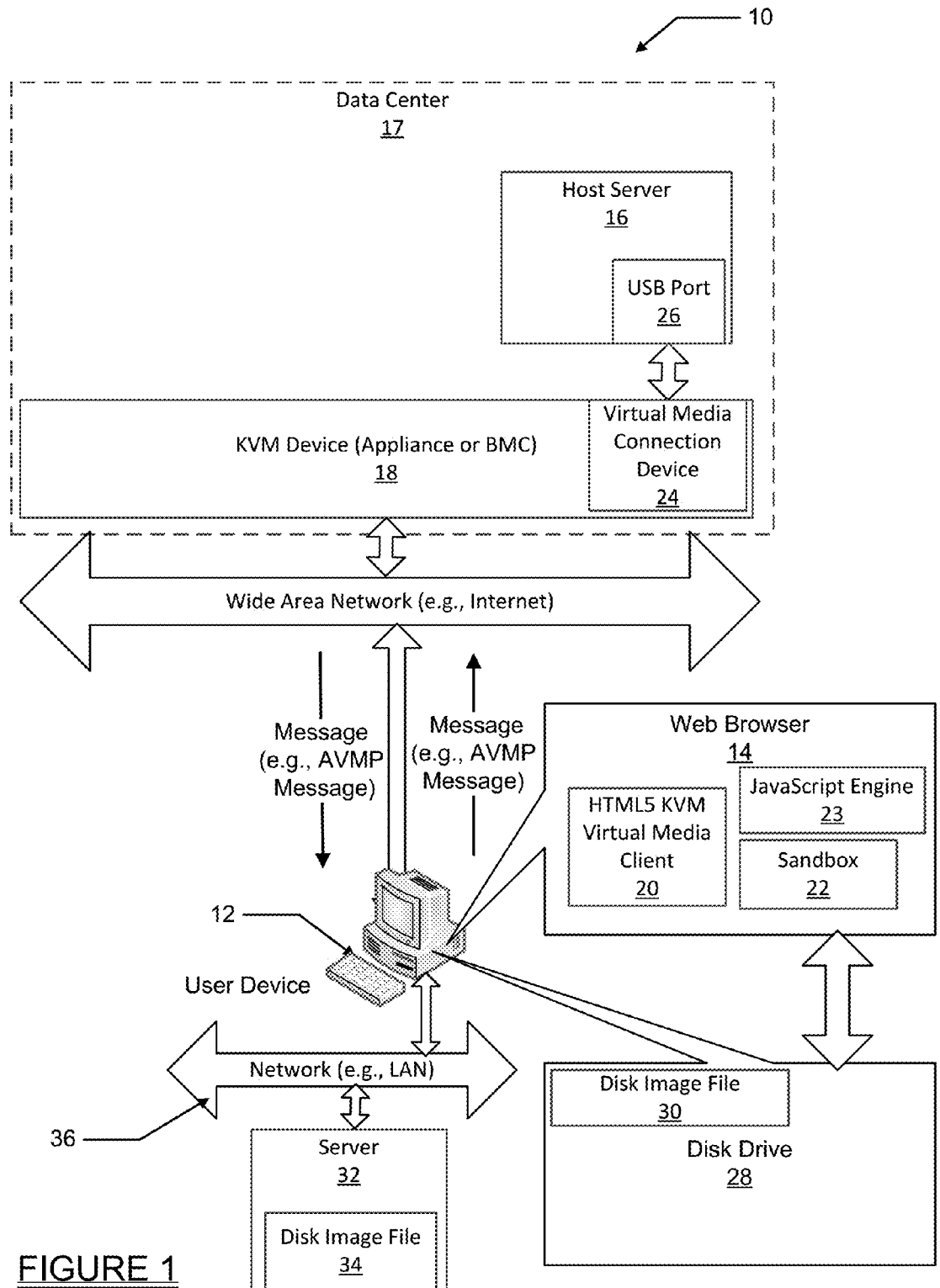
FIG. 1 is a high level diagram of a system in accordance with one embodiment of the present disclosure, in which a disk image file on a hard disk drive of the user's workstation, or available to the user's workstation via a network mounting, is made available to and read by a remote Host server during a KVM session with the Host server.

The following description is merely exemplary in nature and is not intended to limit the present disclosure, application, or uses. It should be understood that throughout the drawings, corresponding reference numerals indicate like or corresponding parts and features.

Referring to FIG. 1, a system 10 is shown in which a user device, in this example a workstation computer 12 having a Web browser 14 running thereon, is used to conduct a KVM session with a remotely located Host server 16 at a Data Center 17. A KVM device, in this example a KVM appliance 18, connects the user workstation 12 with the Host server 16. However, it will be appreciated that a BMC could just as readily be implemented in place of a KVM appliance. For the purpose of discussion, however, reference will be made to the KVM device as being a KVM appliance.

The Web browser 14 may have an HTML5 KVM virtual media client 20 running in it. The Web browser 14 also provides a "sandbox" 22, which is segregated memory space into which a JavaScript engine 23 running in the Web browser 14 can bring files. However, as noted above, the JavaScript engine 23 is not able to write the files out, nor is it permitted direct access to any of the physical devices (disks of a disk drive, a flash drive, etc.) that are contained within the workstation 12, or physically connected to the workstation, or accessible by the workstation via a network connection.

The HTML5 KVM virtual media client 20 communicates with a wide area network connection (e.g., the Internet). The wide area network connection enables communication with the Host server 16 via the KVM appliance 18, with a virtual media connection device 24 inside the KVM appliance 18, and with a USB port 26 of the Host server 16. Messages, for example and without limitation AVMP (Avocent Virtual Messaging Protocol) messages, are communicated between the HTML5 KVM virtual media client 20 and the Host server 16 when disk image files are accessed from the workstation 12 and exposed to the Host server 16, and when status updates (e.g., number of bytes transferred) are sent from the HTML5 KVM virtual media client 20 to the Host server 16. The AVMP is a proprietary messaging protocol of Avocent, Inc., which is an Emerson Network Power company. However, any other suitable messaging protocol could be used.

Exposing the disk image files to the Host server 16 provides a means for allowing the Host server 16 to access all or just selected portions of the disk image files stored on the workstation 12, or network mounted to the workstation. Accordingly, any virtual media device (e.g., flash drive, portable memory device, etc.) that may be physically connected to the workstation 12, or any disk image file accessible to the workstation 12 via a network connection, may potentially be accessed by the Host server 16 using the system 10. Thus, in FIG. 1, a disk image file 30 residing on a disk drive 28 of the workstation 12 may be selected for use. Alternatively, a disk image file 34 residing on server 32, which is in communication with the workstation 12 via network 36, may be network mounted to the workstation 12, and thus made available for use by the Host server 16.

Figure 2:
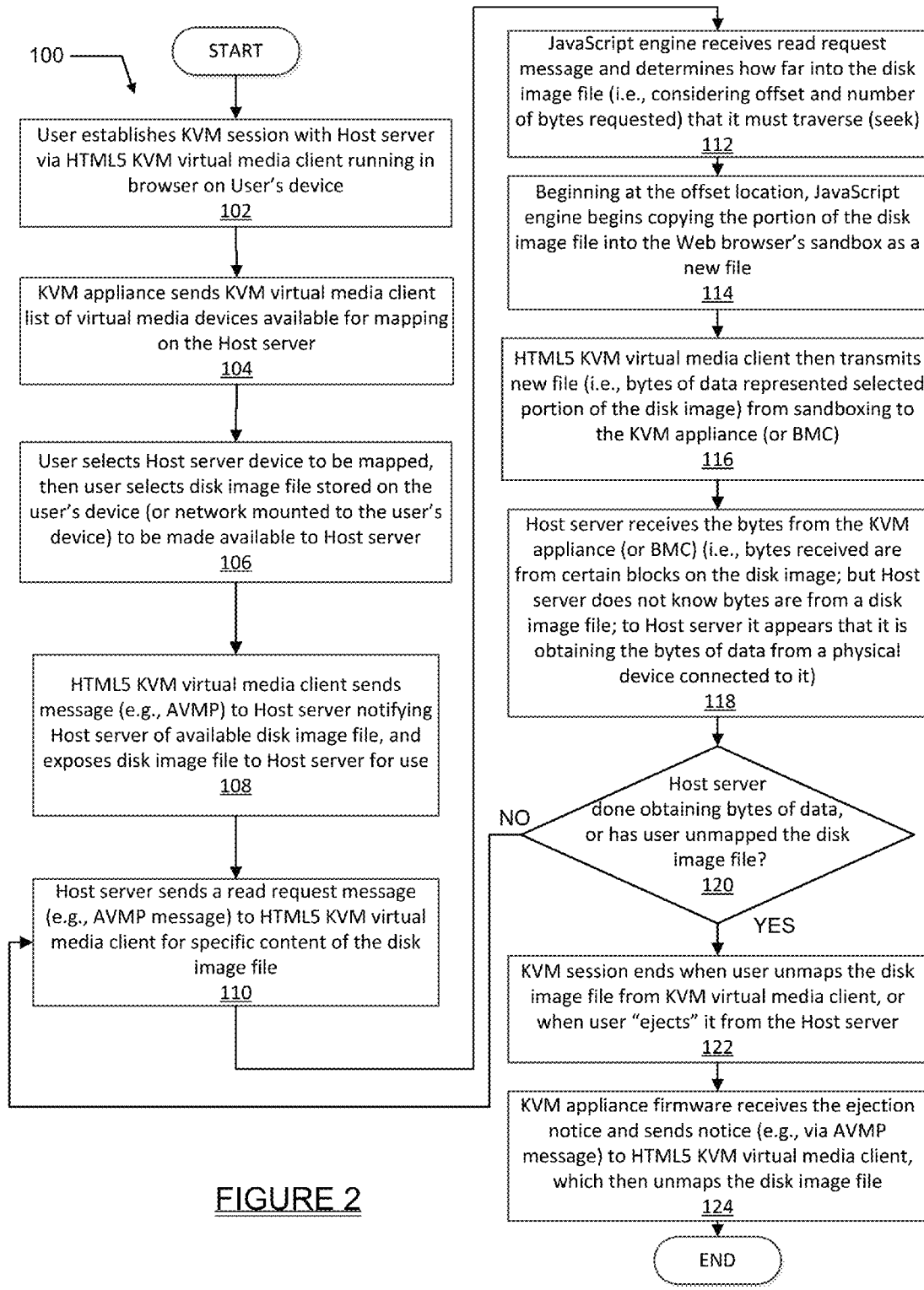
FIG. 2 is a flowchart illustrating one example of a sequence of operations that may be performed by the system shown in FIG. 1 during a KVM session when the Host server reads a portion of a disk image file on the workstation's disk drive.

Referring to FIG. 2, a flowchart 100 is shown illustrating one sequence of operations that may be performed by the system 10 when using the HTML5 KVM virtual media client 20 during a KVM session with the Host server 16. This example assumes that the disk image file being accessed is disk image file 30 on the disk drive 28 of the workstation 12. However, as explained earlier herein, the disk image file could just as easily be located on a different device remote from the workstation (e.g., on server 32 in FIG. 1), and network mounted on the workstation 12.

At operation 102 the user initially establishes a KVM session with the Host server 16 via the HTML5 KVM virtual media client 20 running in the Web browser 14 on the user's workstation 12. At operation 104 the KVM appliance 18 sends to the KVM virtual media client 20 a list of virtual media devices that are available for mapping on the Host server 16 and thus which are available for use by the KVM virtual media client 20. At operation 106 the user selects the Host server device to be mapped, and then the user selects a specific disk image file, in this example disk image file 30 stored on the hard disk drive 28 of the workstation 12. But as mentioned above, alternatively disk image file 34, which is network mounted to workstation 12, could be selected. When the user selects a specific disk image file, the JavaScript engine 23 determines the size of the disk image file 30. For example, and without limitation, the disk image file 30 may be an image of a FAT32 file system, an image of an ISO9660 file system, or potentially an image of any other type of file system. At operation 108 the HTML5 KVM virtual media client 20 may send an AVMP message (or using any other suitable messaging protocol) to the Host server 16 notifying it of the available disk image file 30, and exposing the disk image file to the Host server 16 for use. By "exposing", it will be appreciated that the disk image file is mounted in accordance with a requirement of the LINUX® operating system, which the KVM appliance 18 in this example is running, and then made available to the Host server 16 for use.

At operation 110 the Host server 16 may send a read request message (e.g., an AVMP message) to the HTML5 KVM virtual media client 20 for specific content of the disk image file 30. At operation 112 the JavaScript engine 23 may receive the read request message and may determine, considering the offset and number of bytes requested, how far into the disk image file 30 that it must traverse (i.e., seek) to obtain the requested bytes of data. At operation 114, beginning at the offset location, the JavaScript engine 23 may begin copying the portion of the disk image file 30 into the Web browser's sandbox 22. By this action the JavaScript engine 23 creates a new file in the sandbox 22, with the new file representing the selected (i.e., just copied) portion of the disk image file 30. It will be appreciated that the above operation of the JavaScript engine 23 is the only means available to get the data from the disk image file outside of the sandbox 22 to the Host server 16. The creation of a new file inside the sandbox 22 is the only means by which the browser's JavaScript engine 23 can bring that data into the sandbox 22. The vMedia JavaScript code needs the data in the sandbox 22 before it can transmit the data to the Host server 16 via the KVM appliance 18.

At operation 116, the HTML5 KVM virtual media client 20 may then transmit the new file from the sandbox 22 to the KVM appliance 18 (or BMC). The new file that is transmitted will include the bytes of data that represent the selected portion of the disk image file 30.

At operation 118 the Host server 16 receives the transmitted bytes of data from the KVM appliance 18. The bytes of data represent one or more blocks of data that form the selected portion of the disk image file 30. The Host server 16 does not realize that the bytes of data are from disk image file 30; to the Host server 16 it appears that it is obtaining the bytes of data from a physical device connected to its USB port 26.

At operation 120 a check is made if the Host server 16 is done obtaining the bytes of data that make up the selected portion of the disk image file 30, or if the user has unmapped the disk image file. If the answer is "No", then operations 110-118 are re-performed to obtain one or more blocks of data of the selected disk image 30 to complete the read request. If the check at operation 120 produces a "Yes" answer, then at operation 122 the KVM session ends when the user unmaps the disk image file 30 from the HTML5 KVM virtual media client 20, or when the user "ejects" it from the Host server 16. By the term "ejects", it will be appreciated that to the Host server 16 it appears that it is accessing a physical device that has the disk image file 30 on it. As such, a command such as the USB "Eject" command may be provided by the Host server 16. The USB Eject command instructs that the disk image file 30 be unmapped from the KVM appliance 18. Again, it will be appreciated that at this point the Host server 16 does not know that the USB device it is interacting with represents a virtual disk. To the Host server 16 it appears as if it is communicating with an actual disk drive. At operation 124, the KVM appliance 18 firmware receives the ejection notice and sends notice to the HTML5 KVM virtual media client 20, such as by an AVMP message, which then unmaps the disk image file 30.

By the system 10 and method described herein, disk image files can be readily accessed by a remote host server during a KVM session, even if the disk image files are too large to be copied into the sandbox of the user's Web browser. By selecting portions of the disk image files and sequentially transmitting blocks of data representing the selected portions, disk image files of virtually any size can be accessed, copied into the Web browser's sandbox 22, and transmitted by the HTML5 KVM virtual media client 20 to the KVM appliance 18 to be exposed to the Host server 16 for use. The user's familiarity with using the Web browser 14 will typically be a significant advantage to the user in conducting a KVM session. By having the HTML5 KVM virtual media client 20 running in the Web browser 14, this provides a highly familiar and convenient means by which the user is able to conduct a KVM session.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for exposing virtual disk images on a user device, where the user device is running an HTML5 KVM (Keyboard, video, and mouse) virtual media client in a Web browser of the user device, and where the user device has established a KVM (Keyboard, video, and mouse) session with a KVM (Keyboard, video, and mouse) device associated with the remote device, the method comprising:
  obtaining a selected disk image file for use by the user device;
  sending a message to the remote device that the disk image file is available for use;
  using the HTML5 KVM (Keyboard, video, and mouse) virtual media client of the user device, to expose the disk image file for use to the remote device;
  using the remote device to send a request message to the HTML5 KVM (Keyboard, video, and mouse) virtual media client of the user device requesting a specific portion of the disk image file;
  using the HTML5 KVM (Keyboard, video, and mouse) virtual media client to receive the request message;
  using a script engine running in the Web browser to determine a offset into the disk image file and a specific number bytes making up the specific portion of the disk image file being requested, and
  copying the specific number of bytes into a sandbox of the Web browser and creating a new file available to the Web browser of just the specific portion of the disk image requested by the remote device;
  using the remote device to make an additional request for an additional specific portion of the disk image, and transmitting the additional request in message form to the HTML5 KVM (Keyboard, video, and mouse) virtual media client; and
  transmitting the new file to the remote device.

2. The method of claim 1, wherein obtaining the disk image file comprises obtaining at least one of:
an image of a FAT32 file system; or
an image of an ISO9660 file system.

3. A method for exposing virtual disk images on a user device, where the user device is running an HTML5 KVM (Keyboard, video, and mouse) virtual media client in a Web browser of the user device, and where the user device has established a KVM (Keyboard, video, and mouse) session with a KVM (Keyboard, video, and mouse) device associated with the remote device, and where the Web browser includes a sandbox, the method comprising:
obtaining a selected disk image file for use by the user device;
sending a message to the remote device that the disk image file is available for use;
using the HTML5 KVM (Keyboard, video, and mouse) virtual media client of the user device to expose the disk image file for use to the remote device;
using the remote device to send a request message to the HTML5 KVM virtual media client of the user device requesting a specific portion of the disk image file;
using the HTML5 KVM (Keyboard, video, and mouse) virtual media client to receive the request message and using a script engine running in the Web browser to determine which specific bytes of the disk image file are being requested in the request message; using the script engine to copy the specific bytes being requested into the Web browser's sandbox to form a new file;
using the HTML5 KVM (Keyboard, video, and mouse) virtual media client to transmit the new file from the sandbox to the remote device; and
using the remote device to receive the new file.

4. The method of claim 3, further comprising:
prior to obtaining a disk image, using the remote device to provide a list of virtual media devices to the HTML5 KVM (Keyboard, video, and mouse) virtual media client which are available for mapping onto the remote device; and
using the HTML5 KVM (Keyboard, video, and mouse) virtual media client to send a message to the remote device requesting a specific one of the virtual media devices be mapped on to the remote device.

5. The method of claim 3, wherein the messages exchanged between the remote device and the HTML5 KVM (Keyboard, video, and mouse) virtual media client comprise messages in accordance with an Avocent Virtual Messaging Protocol.

6. The method of claim 3, wherein the operation of using a script engine running in the Web browser of the user device comprises using a Javascript engine.

7. The method of claim 3, wherein the operation of using a script engine to determine the specific bytes of the disk image file that are being requested comprises using a Javascript engine to determine an offset into the disk image file and the specific number of bytes that make up the requested portion of the disk image file.

8. The method of claim 3, further comprising:
using the remote device to make an additional request for an additional specific portion of the disk image, and transmitting the additional request in message form to the HTML5 KVM (Keyboard, video, and mouse) virtual media client.

9. The method of claim 3, further comprising using the HTML5 KVM (Keyboard, video, and mouse) virtual media client to send a status message to the remote device informing the remote device, the status message including information concerning the number of bytes that were sent to the host device in the new file.

10. The method of claim 3, wherein the disk image file is network mounted to the user device.

11. The method of claim 3, further comprising:
using the script engine to initially determine a number of bytes that make up the selected disk image file; and
wherein using the script engine comprises using a Javascript engine.

12. The method of claim 3, wherein obtaining the selected disk image file comprises obtaining an image of a FAT32 file system.

13. The method of claim 5, wherein obtaining the selected disk image file comprises obtaining an image of an ISO9660 file system.

14. A system for exposing virtual disk images on a user device to a remote device, the system comprising:
a user device;
a Web browser running on the user device, the Web browser having a sandbox:
an HTML5 KVM (Keyboard, video, and mouse) virtual media client running in the Web browser of the user device;
a script engine running in the Web browser;
the HTML5 KVM (Keyboard, video, and mouse) virtual media client configured to:
obtain a selected disk image file for use by the user device;
send a message to the remote device that the disk image file is available for use;
expose the disk image file to the remote device for use;
receive a request message from the remote device requesting a specific portion of the disk image file;
use the script engine to copy selected bytes of information from the disk image file corresponding to just the requested portion of the disk image file into the sandbox of the Web browser, and creating a new file using the selected bytes; and
transmitting the new file to the remote device.

15. The system of claim 14, wherein the script engine comprises a Javascript engine.

16. The system of claim 14, wherein the script engine determines an offset into the disk image file, when determining the selected bytes that correspond to the specific portion of the disk image file being requested.

17. The system of claim 14, wherein the HTML5 KVM (Keyboard, video, and mouse) virtual media client is configured to send a status message to the remote device informing the remote device of the number bytes transmitted.

* * * * *